No. 841,176. PATENTED JAN. 15, 1907.
W. A. POWERS.
APPARATUS FOR TREATING AND STORING WATER.
APPLICATION FILED OCT. 10, 1904.
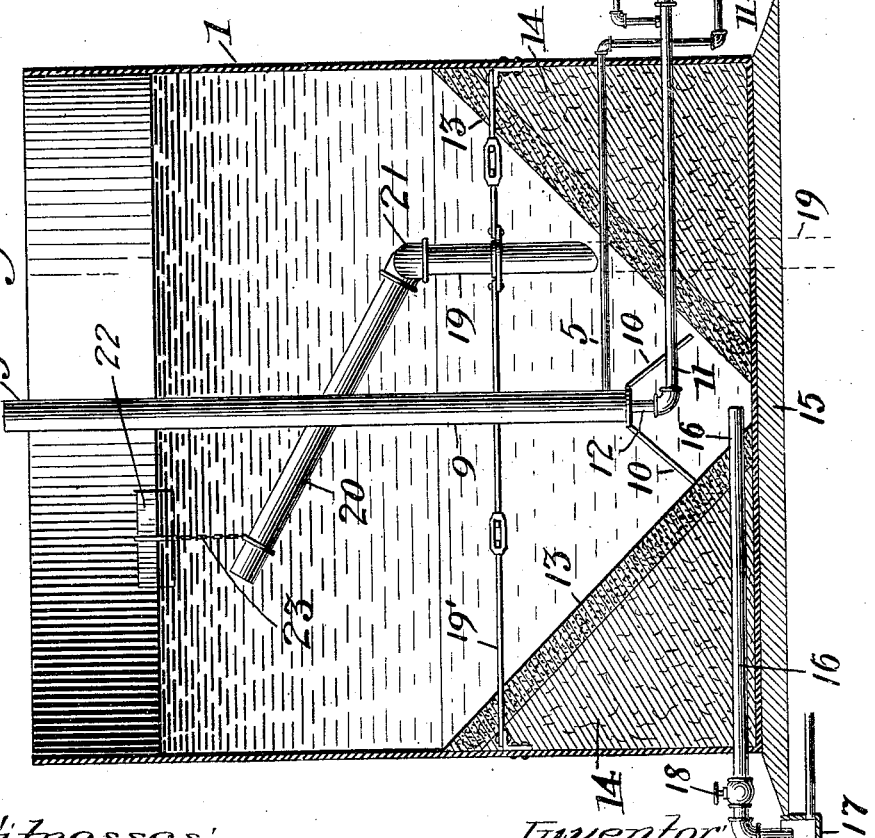
Witnesses:
Chas. H. Buell.
Wm. Berghahn.
Inventor:
William A. Powers.
By Thomas F. Sheridan,
Atty.

UNITED STATES PATENT OFFICE.

WILLIAM A. POWERS, OF TOPEKA, KANSAS.

APPARATUS FOR TREATING AND STORING WATER.

No. 841,176.     Specification of Letters Patent.     Patented Jan. 15, 1907.

Application filed October 10, 1904. Serial No. 227,846.

*To all whom it may concern:*

Be it known that I, WILLIAM A. POWERS, a citizen of the United States, residing at Topeka, in the county of Shawnee and State of Kansas, am the inventor of certain new and useful Improvements in Apparatus for Treating and Storing Water, of which the following is a specification.

The principal object of my invention is to provide a simple, economical, and efficient apparatus for treating and storing water.

Further objects are to provide in an apparatus for treating and storing water a tank adapted to contain water during and after treatment, suitable means for drawing off the treated purified or softened water from the tank, means for drawing off the sediment and precipitates without disturbing the treated purified water, means for mixing such chemical solution with the water to be treated in the desired proportion in the treating-tank in such a manner that the chemicals will be thoroughly mixed with the water passing into the treating-tank before it mingles with the water already contained in the treating-tank, means for permitting entrained air to escape without coming in contact with the settling of the precipitates contained in the water in the tank, and suitable means whereby the precipitates contained in the water passing into the treating and storing tank will be directed toward the bottom of the tank after first being thoroughly mixed with the incoming water, so as to facilitate the settlement of the precipitates and prevent the agitation of the water in the tank.

Other and further objects of the invention will appear from an examination of the drawings and the following description and claims.

The invention consists in the features, combinations, and details of construction hereinafter described and claimed.

In the accompanying drawings, Figure 1 is a sectional elevation showing an apparatus for the treatment and storage of water; Fig. 2, an enlarged detail, partly in section, showing the arrangement of the water and chemical-mixture-supply pipes and open standpipe.

The numeral 1 in the illustrations refers as a whole to a type of water treating and storage tank embodying my invention, and the numeral 2 refers to any suitable structure for the preparation and storage of the chemical precipitants to be used in treating the water in tank 1. In the structure 2 is suitably disposed a receptacle 3 for holding the chemical precipitants. This receptacle 3 is in communication with the tank 1 by means of pipes 4 and 5, through which by means of pump 6 the chemical precipitants are forced under pressure into tank 1, as will later be more particularly pointed out.

The numeral 7 denotes a water-supply pipe for the receptacle 3, connecting with the main water-pipe 11, and 8 represents a platform to be used in charging the receptacle 3 with a proper solution of chemical precipitants.

It is very desirable to provide means whereby the water to be treated and which is introduced into the treating and storage tank may be thoroughly mixed with the chemicals before it mingles with the water already contained in the treating and storage tank and whereby the entrained air in the water to be treated may be permitted to escape without mingling with the water already similarly treated and contained in such tank, so that such air when escaping will not come in contact with the precipitates contained in the tank and interfere with the settling of the precipitates. It is also desirable that the water introduced into the treating and storage tank be so directed downward at the point of mingling with the water already contained in the tank that it will direct the precipitates mixed with the inflowing water toward the bottom of the tank, so as to facilitate the settling of such precipitates. It is also desirable that the inflowing water be so directed at its point of mingling with the water already contained in the tank that it will not cause a current in the tank sufficient to agitate the water already contained therein or prevent the settling of the precipitates, but will permit the treated, softened, or purified water to be drawn from near the surface thereof and a constant supply of water to be introduced in such a manner as to raise the clearest or purest portion of the water contained in the tank bodily toward the top. It is also highly desirable to provide means for enabling the precipitates and sediment to be drawn off without disturbing the other contents of the tank and without the necessity of emptying the tank.

In order to accomplish the above purposes and to produce such other advantages as will appear to those skilled in the art, I provide a stand-pipe 9, having a space between its lower end and the bottom of the tank and having its upper end extending outside of and above the water contained in the tank, both ends of such pipe being open. The lower end of this stand-pipe is in practice about four feet from the bottom of the tank. Suitable stays 10, which may be of any ordinary and well-known type, are provided for holding the stand-pipe in position. A water-supply pipe 11 extends into the tank and is provided at its inner end with an upwardly-extending discharge portion 12 in the form of an elbow which extends into the lower open end of the stand-pipe. The opposite end of this water-supply pipe is connected with a suitable source of water-supply, the water of course being under sufficient head or pressure to cause it to enter the tank, notwithstanding the pressure of the water already contained therein. The stand-pipe is of a much larger diameter than the upwardly-extending or elbow portion of the water-supply pipe, so that the water forced into the stand-pipe is caused to flow upward therein until it mingles with the chemicals introduced through the pipe 5 and then with the precipitates to flow out of the lower end of the stand-pipe into the tank, mingling with the water already contained in the tank, directing the course of the precipitates toward the bottom of the tank, but not disturbing the water contained in the tank sufficient to prevent the precipitates from settling.

In order to enable the chemical solution to be mixed thoroughly with the inflowing water before such water mingles with the water already contained in the tank, the pipe 5, which by means of pump 6 and pipe 4 communicates with the chemical-tank 3, has its inner end connected with the stand-pipe and communicating with the interior thereof at a point a short distance above the lower end of the stand-pipe. Its discharge end should preferably extend upward inside the stand-pipe, as shown in Fig. 2. The water forced into the stand-pipe from the water-supply pipe 11 is thus forced upward past the outlet of the chemical-supply pipe 5, and the chemical solution is thus caused to thoroughly mix with the inflowing water before mingling with the water already in the tank. The stand-pipe 9 being open at the top, it will be readily seen that the entrained air which escapes from the inflowing water may pass upward through the stand-pipe 9 and escape without coming in contact with or in any way interfering with the settling of the precipitates in the water already contained in the tank. It will also be noted that the size of the lower opening in the stand-pipe 9 is sufficiently large to provide a sufficient space between the walls of the stand-pipe 9 and the water-supply pipe 11, so that the water discharged therefrom into the tank will not cause a current sufficient to agitate the contents of the tank, but will practically raise the water contained in the tank above the outlet of the stand-pipe bodily without disturbing it to any extent.

In order to cause the precipitates to settle in as small a space as possible, so as to be readily withdrawn, and to permit the inflowing of the water with as large a proportion of the contents of the tank as possible above the inflowing water, the tank is provided with a conical bottom 13, of Portland-cement concrete, extending downward and inward at an incline from the outer cylindrical walls of the tank to a point near the center of the base thereof. The space between this concrete bottom and the metallic bottom portion of the tank is filled with broken stone and sand, which forms a suitable filler 14 for supporting the concrete-bottom portion. The metallic bottom portion is of course united to the metallic cylindrical shell portion by means of rivets (not shown) or in any ordinary and well-known manner, so as to form a water-tight tank, and the whole is mounted upon a suitable base 15 of broken stone or gravel.

A sediment or sludge discharge pipe 16 extends, preferably, through the concrete bottom, with its inner end opening into the tank at or near the bottom thereof and its outer end communicating with a sludge-box 17 or with a sewer or other receptacle for the sediment which is to be drawn off from the bottom of the tank. A suitable cock or valve 18 is provided, by means of which this discharge-pipe or sediment-outlet may be opened or closed when desired.

In order to provide suitable means whereby the purified water may be drawn off from a point near the surface thereof, a suitable discharge-pipe 19, supported as by the rods 19', is arranged in the tank. It extends out through the bottom of the tank, so as to be connected with a crane in the ordinary manner when employed for railroad use, and is provided on the inside of the tank with a floating pipe portion 20, having a flexible joint 21, by means of which such floating pipe portion is connected with the discharge-pipe proper. The upper end of the floating pipe portion is provided with a buoy 22, which is buoyant and is connected with the floating pipe by means of a chain or similar element 23. This buoy is made of wood or other material buoyant in water and serves to hold the upper end of the floating pipe portion sufficiently near the surface of the water to enable it to draw off only water which has been properly treated.

In operation it is first necessary to supply the receptacle 3 with the solution for treating the water. This solution when complete preferably contains slaked lime, soda-ash, and sufficient water to make a suitable liquid solution of the desired strength. The receptacle 3 having been charged with a suitable solution, the water to be treated is set to flowing through pipe 11 into the stand-pipe 9, and the chemical solution is pumped by way of pipe 5 from the chemical-tank 3 into the water as it flows in the stand-pipe 9 in the manner already suggested, so that the inflowing water is thoroughly mixed with the chemical solution in the desired proportions before it mingles with water treated and contained in the tank. The precipitates having settled, leaving the water purified and softened, they are then drawn off from the bottom of the treating and storage tank through the pipe 16, and the treated water is then, and even during the drawing off of the precipitates and the introduction and treatment of inflowing water, ready to be drawn off through the floating pipe for use.

I claim—

1. In an apparatus for treating and storing water, the combination of a tank, a stand-pipe having its lower open end communicating with the interior of the tank and arranged at a distance from the bottom thereof, a water-supply pipe having its discharge end extending upward inside of the stand-pipe, and a chemical-supply pipe having its discharge end communicating with the interior of the stand-pipe, substantially as described.

2. In an apparatus for treating and storing water, the combination of a tank, a pipe having its lower open end communicating with the interior of such tank and arranged at a distance from the bottom thereof, a water-supply pipe communicating with the interior of such pipe, a tank for containing a chemical solution, and a pipe connected with the chemical-tank having its discharge-opening inside the stand-pipe, substantially as described.

3. In an apparatus for treating and storing water, the combination of a tank, a stand-pipe having its lower open end communicating with the interior of such tank and arranged at a distance from the bottom thereof and its upper end open and extending above the water contained in the tank, a water-supply pipe having its discharge end extending upward inside of the stand-pipe, and a chemical-supply pipe having its discharge-opening inside of the stand-pipe, substantially as described.

4. In an apparatus for treating and storing water, the combination of a treating and storage tank, a stand-pipe having its lower open end communicating with the interior of such tank and arranged at a distance from the bottom thereof, a water-supply pipe having its discharge end communicating with the interior of the stand-pipe, a tank for containing a chemical solution, a chemical-supply pipe communicating with such chemical-tank and having its discharge end communicating with the interior of such stand-pipe, and means for forcing the chemical solution through such chemical-supply pipe into the stand-pipe, substantially as described.

5. In an apparatus for treating and storing water, the combination of a tank provided with a water-outlet, a stand-pipe mounted in such tank having its lower open end arranged at a distance from the bottom thereof, a water-supply pipe communicating with the interior of such stand-pipe, a chemical-supply pipe having its discharge-opening communicating with the interior of the stand-pipe, and means for removing the sediment from the bottom of the tank, substantially as described.

6. In an apparatus for treating and storing water, the combination of a tank, a stand-pipe mounted in such tank having its lower open end arranged at a distance from the bottom thereof, a water-supply pipe communicating with the interior of such stand-pipe, a chemical-supply pipe having its discharge-opening communicating with the interior of the stand-pipe, a discharge-pipe provided with a movable portion inside of the tank, and a buoy attached to such movable portion of the discharge-pipe for supporting its receiving end near the top of the water contained in the tank, substantially as described.

7. In an apparatus for treating and storing water, the combination of a tank provided with an inclined bottom and having a water-outlet opening, a stand-pipe mounted in such tank having its lower end arranged at a distance from the bottom thereof and its upper end open and extending above the water contained in the tank, a water-supply pipe communicating with the interior of such stand-pipe, a chemical-supply pipe having its discharge end communicating with the interior of the stand-pipe, and means for drawing off the sediment from the bottom of such tank, substantially as described.

8. In an apparatus for treating and storing water, the combination of a tank provided with an inclined bottom, a discharge-pipe communicating with the lowest part of said tank, a stand-pipe provided with open upper and lower ends disposed in said tank at a distance from the bottom thereof and substantially over the lowest part of said bottom, a water-inlet pipe communicating with the interior of said stand-pipe and a chemical-supply pipe communicating with the interior of the stand-pipe directly above the outlet of the water-pipe, substantially as described.

9. In an apparatus for treating and storing water, the combination of a tank provided with an inclined bottom, a discharge-pipe communicating with the lowest part of said tank, a stand-pipe provided with open upper and lower ends disposed in said tank at a distance from the bottom thereof and substantially over the lowest part of said bottom, a water-inlet pipe communicating with the interior of said stand-pipe, a chemical-supply pipe communicating with the interior of the stand-pipe directly above the outlet of the water-pipe and means for forcing a chemical solution through said chemical-supply pipe.

10. In an apparatus for treating and storing water, the combination of a tank and stand-pipe provided with open upper and lower ends disposed at a distance from the bottom of said tank, a water-supply pipe and a chemical-supply pipe communicating with the open-ended stand-pipe at different levels and means for forcing a chemical solution through said chemical-supply pipe.

WILLIAM A. POWERS.

Witnesses:
ERWIN H. BERRY,
R. N. TREZISE.